US009127636B2

(12) United States Patent
Neet et al.

(10) Patent No.: US 9,127,636 B2
(45) Date of Patent: Sep. 8, 2015

(54) VARIABLE FLUX STARTER AND SWITCH SYSTEM

(71) Applicant: Remy Technologies, LLC, Pendleton, IN (US)

(72) Inventors: Kirk Neet, Pendleton, IN (US); David Fulton, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 25 days.

(21) Appl. No.: 14/215,584

(22) Filed: Mar. 17, 2014

(65) Prior Publication Data

US 2014/0260794 A1 Sep. 18, 2014

Related U.S. Application Data

(60) Provisional application No. 61/791,362, filed on Mar. 15, 2013.

(51) Int. Cl.

*H02P 1/00* (2006.01)
*F02N 11/08* (2006.01)
(Continued)

(52) U.S. Cl.

CPC .......... *F02N 11/0851* (2013.01); *F02N 11/087* (2013.01); *F02N 15/065* (2013.01);
(Continued)

(58) Field of Classification Search

CPC .............. F02N 11/0851; F02N 15/067; F02N 2200/048; F02N 11/08; F02N 11/087; F02N 2011/0892; F02N 15/065; F04B 17/03
USPC ......... 318/136, 139, 778, 264, 445, 520, 529; 335/106, 114, 118, 119, 121, 122, 136, 335/259; 123/179.1, 179.3, 179.4; 290/38 C, 38 R, 48
See application file for complete search history.

(56) References Cited

U.S. PATENT DOCUMENTS

| | | | | |
|---|---|---|---|---|
| 5,742,137 | A * | 4/1998 | Bratton et al. | 318/139 |
| 5,780,934 | A * | 7/1998 | Imanishi et al. | 290/38 R |
| 6,104,157 | A * | 8/2000 | Kramer et al. | 318/445 |
| 6,354,257 | B1 * | 3/2002 | Marshall et al. | 123/179.3 |
| 6,718,927 | B2 | 4/2004 | Goetze et al. | |
| 6,995,490 | B2 | 2/2006 | Lakerdas et al. | |

(Continued)

FOREIGN PATENT DOCUMENTS

| | | | |
|---|---|---|---|
| EP | 2568159 | A1 | 3/2013 |
| JP | 2004-257369 | A | 9/2004 |

OTHER PUBLICATIONS

International Search Report and Written Opinion; PCT/US2014/030418; Aug. 1, 2014.

*Primary Examiner* — Eduardo Colon Santana
*Assistant Examiner* — Thai Dinh
(74) *Attorney, Agent, or Firm* — Bose McKinney & Evans LLP

(57) ABSTRACT

A variable flux starter and switch system including a starter motor with motor field winding first and second portions, a control unit capable of selectively issuing starter activation and desired flux level signals, a motor energizing switch moveable between open and closed positions consequent to issuance of the starter activation signal, and a regulating device that transitions between default and activated operational states consequent to issuance of the flux level signal. The regulating device has a moveable blocking member and relatively moveable contact members, and in one of the default and activated operational states, electrical contact between the contact members is permitted or prevented by the blocking member. Current through the closed motor energizing switch substantially bypasses a motor field winding portion when electrical contact between the contact members is permitted, and is conducted through both portions when prevented. Also, a method for varying starter motor flux levels.

20 Claims, 10 Drawing Sheets

(51) Int. Cl.
*F02N 15/06* (2006.01)
*F02D 41/06* (2006.01)

(52) U.S. Cl.
CPC ............ *F02N15/067* (2013.01); *F02D 41/064* (2013.01); *F02D 41/065* (2013.01); *F02N 2011/0892* (2013.01); *F02N 2300/102* (2013.01); *F02N 2300/104* (2013.01); *F02N 2300/2002* (2013.01); *Y10T 74/132* (2015.01)

(56) References Cited

U.S. PATENT DOCUMENTS

| | | | | |
|---|---|---|---|---|
| 7,973,623 | B2 * | 7/2011 | Andoh .......................... | 335/126 |
| 8,476,997 | B2 * | 7/2013 | Hrnjak et al. ................. | 335/126 |
| 8,487,573 | B2 * | 7/2013 | Nakamura .................... | 318/437 |
| 8,994,299 | B2 * | 3/2015 | Kokubun et al. .............. | 318/139 |
| 2009/0026896 | A1 | 1/2009 | Andoh | |

* cited by examiner

VARIABLE FLUX STARTER AND SWITCH SYSTEM

PRIORITY CLAIM TO RELATED APPLICATION(S)

This application claims the benefit, under Title 35, U.S.C. §119(e), of U.S. Provisional Patent Application Ser. No. 61/791,362 entitled VARIABLE FLUX STARTER AND SWITCH SYSTEM filed Mar. 15, 2013, the entire disclosure of which is expressly incorporated herein by reference.

BACKGROUND

The present invention relates to vehicles which include an internal combustion engine and, more specifically, to starters and their switching systems used with such vehicles.

Conventional internal combustion engine vehicles utilize a starter when initially starting the internal combustion engine. Typically, the battery powers an electrical starter motor which turns a flywheel and thereby turns the engine over. A solenoid is typically used to move a pinion gear into and out of engagement with a ring gear affixed to the engine's flywheel. The starter provides torque to the engine for a brief period of time until the engine starts to operate normally and no longer needs its assistance.

In a conventional vehicle, the starter will be used when initially starting the engine and the engine will continue to run until the operator intentionally stops the engine. Furthermore, many vehicles have begun employing a stop-start system where the electronic control unit of the vehicle intentionally stops the engine based upon the operating conditions of the vehicle and subsequently quickly restarts the engine based upon operating conditions of the vehicle. In many vehicles, the same starter assembly used to initially start the engine is also used when the ECU automatically restarts the engine after stopping the engine as a part of a stop-start system.

Hybrid vehicles often employ a stop-start system to temporarily stop the operation of the internal combustion engine when the vehicle is brought to a stop or when the forward propulsion of the vehicle can be entirely provided by an electric traction motor, but such stop-start systems are also used in non-hybrid vehicles which are entirely reliant upon an internal combustion engine for propulsion. In such non-hybrid vehicles, the stop-start system will typically stop engine operation when the brake is being applied and the vehicle is being brought to a stop or when the vehicle is stopped, and the internal combustion engine must be quickly restarted to resume powered vehicle movement.

In starter-based stop-start systems, the starter must restart the internal combustion engine quickly to ensure acceptable vehicle drivability characteristics, particularly in non-hybrid vehicles where the internal combustion engine is the sole propulsion power source. A stop-start system may have "change-of-mind" capabilities by which it is able to restart the engine very shortly after engine operation was stopped and the flywheel is still inertially rotating. In such starter-based stop-start systems, the starter will typically have a pinion gear that is capable of engaging a rotating ring gear that is coupled with a flywheel to thereby restart the engine. Such starters may have what is referred to as a synchronized design wherein the rotational speeds of both the pinion gear and the ring gear are sensed and the pinion gear engages the ring gear only when the speeds of the two gears are synchronized.

FIG. 1 schematically depicts vehicle 20 with starter and switch system 22. Vehicle 20 includes internal combustion engine 24 and drivetrain 26 that transmits torque from engine 24 to driven wheels 28. Although depicted vehicle 20 is a front-wheel drive passenger car, the vehicle could be of any powertrain configuration with a conventional or stop-start internal combustion engine or a hybrid powertrain. Moreover, as depicted, vehicle 20 may be a vehicle having starter and switch system 22 according to the prior art, or according to the present disclosure; a detailed description of the latter is provided further below. In other words, starter and switch system 22 is generic.

In vehicle 20, ring gear 30 is mounted on the outer circumference of a flywheel coupled to the drive shaft of engine 24. Starter and switch system 22 of vehicle 20 includes generic starter assembly 32 used to rotate the flywheel when starting engine 24. Starter assembly 32 includes electric motor 34 having a field winding, an armature or rotor, an armature shaft, a commutator, carbon brushes, a supporting frame, and a motor housing. The armature and commutator are mounted on armature shaft 36, which is coupled to pinion shaft 38 through overrunning clutch 40.

Starter motor 34 is typically a brushed DC motor and operates in a conventional manner, with the field winding forming a stationary electromagnetic field. As the armature rotates, the commutator segments contact different brushes and reverse polarity to thereby cause the continued rotation of the armature. The field and armature windings may form a series motor, a shunt motor, or a compound motor, as is well understood by those having ordinary skill in the art.

Pinion gear 42 is mounted on pinion shaft 38 of starter assembly 32, and is selectively engageable with ring gear 30. Pinion gear 42 is shifted axially with pinion shaft 38 into and out of engagement with ring gear 30 by solenoid 44 of starter assembly 32, which acts on pinion shaft 38 and pinion gear 42 through a linkage assembly that includes elongate pinion shift lever 46. A suitable source of electrical direct current, such as conventional 12V car battery 48, for example, is used to provide electrical power to starter motor 34 and solenoid 44 through the starter switch system.

It is to be noted that FIG. 1 is a schematic drawing of a generic starter and switch system that has been simplified. For example, a control circuit that includes the ignition switch of vehicle 20 and a neutral safety switch which prevents the ignition switch from activating starter motor 34 while vehicle 20 is in gear is not shown. Vehicle 20 also includes electronic control unit ("ECU") 50 that controls the operation of starter motor 34 and solenoid 44 of starter assembly 32 by means of relays or other suitable switching mechanisms. ECU 50 receives signals indicative of vehicle system statuses, and issues corresponding control signals to effect responsive vehicle operations, or prevent certain operations, as will be readily appreciated by a person having ordinary skill in the art. Typically, starter relay switch 52 is connected to both solenoid 44 and the field winding of motor 34. An output signal of ECU 50 controls the operation of starter relay switch 52 to selectively open and close a battery circuit to energize and de-energize motor 34 and solenoid 44 of starter assembly 32.

Once engine 24 begins running, pinion gear 42 is disengaged from ring gear 30. Before disengagement of pinion gear 42, however, it is possible for the engine speed to exceed that of the armature of starter motor 34, and overrunning clutch 40 prevents damage to starter motor 34 in such a situation. Overrunning clutch 40 transmits torque from starter motor 34 to pinion gear 42 in one rotational direction, but freewheels in the opposite direction to prevent the ring gear 30 from transmitting torque to the armature of starter motor 34. Consequently, if engine 24 runs at a speed higher than that of the starter motor armature while pinion gear 42 is engaged with ring gear 30, overrunning clutch 40 will allow pinion shaft 38 and pinion gear 42 to rotate at a speed faster than that of armature shaft 36 to which the armature is rotatably fixed. The use of an overrunning clutch between a starter motor and a ring gear is known to those having ordinary skill in the art, and illustrated overrunning clutch 40 operates in a conventional manner to prevent the transmission of torque from ring gear 30 to the armature of starter motor 34.

Starter solenoid 44 includes coil 54 which, when energized, attracts solenoid plunger 56 and electromagnetically forces it axially inwardly relative to solenoid housing 55, which is affixed to the starter motor housing such that the axes of solenoid plunger 56 and armature shaft 36 are generally parallel. As mentioned above, solenoid 44 is used to shift the position of pinion gear 42 axially into and out of engagement with ring gear 30 through elongate shift lever 46. At the first of its two opposite ends, shift lever 46 is pinned to plunger 56 of solenoid 44 or to projection 58 extending from plunger 56. Plunger projection 58 may be part of spring-biased pinion engagement jump device 60 carried by solenoid plunger 56. Shift lever 46 is pivotally mounted near its midpoint to starter frame 62 and, at the second of its two opposite ends, is coupled with armature shaft 36 or pinion shaft 38 via sliding collar 63 disposed about the shaft.

Solenoid plunger 56 is biased in an axially outward direction, relative to solenoid housing 55, by compression solenoid return spring 64. As shift lever 46 is pivotably connected to starter frame 62 near its midpoint, solenoid return spring 64 biases pinion gear 42 axially inwardly towards motor 34 and into the starter's fully retracted, home position, which is shown in FIG. 1. In the starter's home position, pinion gear 42 is axially located away from ring gear 30 and cannot be enmeshed therewith. When solenoid coil 54 is energized, solenoid plunger 56 is electromagnetically pulled axially into solenoid housing 55 against the biasing force of solenoid return spring 64. Shift lever 46 is consequently urged, through pinion engagement jump device 60, to pivot about its midpoint and urge pinion gear 42, through collar 63, axially outwardly away from starter motor 34 and into the starter's extended, engagement position, in which pinion gear 42 is received into engagement with ring gear 30.

During starter engagement, when sliding collar 63 is shifted toward ring gear 30, overrunning clutch 40 and pinion gear 42 will also be shifted toward ring gear 30. If, when solenoid plunger 56 is electromagnetically pulled axially into solenoid housing 55, the teeth of pinion gear 42 do not initially mesh with the teeth of ring gear 30, jump spring 66 of pinion engagement jump device 60 will compress and exert a biasing force on sliding collar 63, through shift lever 46, that urges pinion gear 42 toward ring gear 30. Once the teeth of the pinion and ring gears are aligned to allow for their teeth to mesh, the biasing force exerted by jump spring 66 on sliding collar 63 through shift lever 46 will force pinion gear 42 into meshed engagement with ring gear 30. To similar effect, pinion engagement jump device 60 and its jump spring 66 may be alternatively located on armature shaft 36. Such use for sliding collars and/or pinion engagement jump devices having jump springs is well-known to those having ordinary skill in the art.

FIG. 1 shows solenoid plunger 56 of de-energized solenoid 44 in its extended position achieved under the influence of solenoid return spring 64, thereby forcing pinion gear 42 into the starter's fully retracted, home position wherein pinion gear 42 is axially distanced from and out of engagement with ring gear 30. When solenoid coil 54 is de-energized, solenoid plunger 56 is forced by solenoid return spring 64 axially outward, relative to solenoid housing 55, towards its extended position, thereby causing shift lever 46 to rotate about its pivot point and push sliding collar 63 towards motor 34, thereby moving pinion gear 42 out of engagement with ring gear 30 and urging pinion gear 42 into the starter's retracted, home position. In the starter's home position, a mechanical stop (not shown) on armature shaft 36 positively engages sliding collar 63 to limit its axially inward travel along the shaft towards motor 34. The axially outward travel of pinion gear 42 away from motor 34 may be similarly limited by a mechanical stop to establish the starter's fully extended, engagement position.

In the starter's engagement position, solenoid plunger 56 is located in its fully retracted position while solenoid coil 54 is energized. When solenoid plunger 56 reaches its fully retracted position, lever arm 46 has shifted pinion shaft 38 and pinion gear 42 axially outwardly away from starter motor 34, towards the starter's fully extended, engagement position wherein pinion gear 42 would be enmeshed with ring gear 30. The starter's engagement position may be entered with starter motor 34 de-energized and pinion gear 42 not rotating, as when starting a non-rotating engine 24. Alternatively, the starter's engagement position may be entered with starter motor 34 energized and pinion gear 42 being drivingly rotated, as when restarting engine 24 while its flywheel is still rotating under an inertial load. For example, in some prior starter systems, as the starter enters its engagement position to restart engine 24, the speed of the rotating pinion gear is substantially synchronized with that of the still-rotating ring gear. Regardless of whether the starter motor is rotating at the time of starter engagement, once the pinion and ring gears are enmeshed, they are sped up together as the starter cranks the engine for starting. Typically, starter cranking speed is determined by the level of power supplied to the starter motor field winding and the torque required to crank the engine. For a given power level supplied to the starter motor field winding, trade-offs occur between cranking speed and starter torque. Power, speed and torque may thus be adjusted to refine characteristics of a vehicle starter system.

For example, cold engine starts, which occur when the vehicle operator initially starts the engine, are typically under conditions of the engine oil being viscous and fuel in the cylinders being less readily vaporized than when the engine has just been operating. The engine cranks less readily during cold starts than during warm starts, and does not fire as readily. Thus, higher torque and longer cranking periods typically occur during cold starts than during warm starts. During warm starts, the engine oil is less viscous, and fuel in the engine's combustion chambers will be more readily vaporized and combusted. That relatively shorter cranking periods typically occur, and less cranking torque is required, during warm starts than cold starts is particularly desirable in vehicles having stop-start capabilities in which quick restarting is required. The starter may thus assist the restarted engine in again reaching operating speed more quickly.

For some vehicle applications, particularly those having stop-start systems, it is desirable to provide a starter and switch system 22 capable of providing variable flux to starter motor 34, by which different starter torque, speed, and power characteristics may be selected and/or obtained. Control of starter flux may be accomplished in these starter and switch systems by shorting across a portion of the starter motor field winding, and such variable flux starter and switching systems are often known as having warm-start capabilities. Generic starter assembly 32 shown in FIG. 1 may be of the variable flux type having warm start capabilities.

The operation of a variable flux starter and switch system having warm-start capabilities according to the prior art may be best understood with reference to FIGS. 2A and 2B, which schematically show prior variable flux starter and switch system 122 developed by the assignee of the present application. Elements of generic system 22 described above that are particular to system 122, are similarly represented by the sum of the corresponding generic system's element reference numeral plus 100. Below, in describing a system according to the present disclosure, elements of that system which differ from a corresponding element of prior system 122 are represented by the sum of the generic system's element reference numeral plus 200.

In prior variable flux starter and switch system 122 depicted in FIGS. 2A and 2B, ECU 150 issues separate motor activation signal 68 and desired motor flux level signal 70 at their respective terminals. The issuance of starter activation signal 68 is indicative of desired starter assembly activation. The issuance of flux level signal 70 is indicative of a desired motor flux level different from a default motor flux level, which would result in the absence of flux level signal 70. In system 122, the default motor flux level provides cold-start operation, whereas the issuance of flux level signal 70 provides warm-start operation. In response to issuance of signals 68 and 70, system 122 activates starter assembly 132, and applies a warm-start short condition over a portion of starter motor field winding 74, respectively. As discussed above, when starting engine 24, starter motor 34 is energized, and pinion gear 42 is engaged with ring gear 30 to rotate the flywheel of engine 24 attached to ring gear 30 and provide the initial torque necessary to start engine 24. FIGS. 2A and 2B both show system 122 with motor 134 and solenoid 144 of starter assembly 132 activated, a condition resulting from starter relay switch 52 receiving a starter activation signal 68 issuing from its ECU terminal, as indicated by the check mark (✓) near that terminal. In system 122, starter relay switch 52 has a 2 A coil receivable of the starter activation signal from ECU terminal 68 and is capable of switching 30 A. When activated, starter relay switch 52 energizes solenoid 144 by relaying current from battery 48 to solenoid coil 54.

FIG. 2A shows system 122 in a cold-start operating condition, with no flux level signal 70 issuing from its ECU terminal, as indicated by the X across the lead from that terminal; though here signal 70 is absent, reference numeral 70 is included to indicate in FIG. 2A the respective flux level signal terminal of ECU 150. FIG. 2B shows system 122 in a warm-start operating condition, with flux level signal 70 issuing from its ECU terminal, as indicated by the check mark (✓) near that terminal. Variable flux starter and switch system 122 is adapted to selectively short out one of first portion 74*a* and second portion 74*b* of starter motor winding 74 to increase the rotational speed of starter motor 134 for warm starts. In the examples herein described, starter motor field winding second portion 74*b* is selectively shorted to accomplish warm-start operation.

As warm starts generally crank the engine at a faster speed and with less cranking torque than usually necessary for cold starts, the design shown in FIGS. 2A and 2B has been found advantageous for vehicles having starter-based stop-start capabilities, wherein warm starts are desired to occur as quickly as possible. By not shorting across a portion 74*a* or 74*b* of starter motor field winding 74, i.e., by allowing rotation of its starter motor to be powered by battery current flow through its entire winding 74, as previously done in non-variable flux starters, variable flux starter assembly 132 provides high torque engine cranking performance at lower speeds, which is better suited for cold starts. Selectively shorting across portion 74*a* or (as depicted) portion 74*b* of starter motor field winding 74, however, facilitates high speed, low torque engine cranking suitable for warm starts, and is preferable for stop-start systems which require quick, repetitive engine restarting.

In prior starter and switch system 122, during both cold-start and warm-start operation starter activation signal 68 issues from ECU 150. Solenoid 144 of starter assembly 132 is energized and its plunger 156 is retracted into solenoid housing 55, moving pinion gear 42 towards the starter's extended, engagement position through shift lever 46. Starter assembly 132 includes electric motor 134 and motor energizing switch 76 for directing battery current to field winding 74 of the motor.

Motor energizing switch 76 is generally disposed within housing 55 of starter solenoid 144 and includes moveable contact plate 78 and a fixed pair of separated contact pads 80. Contact plate 78 is carried by solenoid plunger 156 and is moved into electrical engagement with contact pads 80, thereby closing switch 76 and conducting current from battery 48 through switch 76 to motor 134. Thus, with solenoid 144 energized, battery voltage is applied to starter motor field winding 74. During cold-start operation, shown in FIG. 2A, the battery current passing through motor energizing switch 76 is directed through both first portion 74*a* and second portion 74*b* of starter motor field winding 74 in series, resulting in starter motor 134 rotating with a first, low cranking speed and first, high cranking torque suitable for cold starts.

Starter and switch system 122 also includes main shorting relay switch 72 which selectively shorts out second portion 74*b* of starter motor field winding 74 in response to (warm-start) flux level signal 70 issuing from ECU 150. Referring to FIG. 2B, with main shorting relay switch 72 being closed in response to issuance of signal 70, the battery current passed through closed motor energizing switch 76 substantially bypasses starter motor field winding second portion 74*b* and is conducted through only field winding first portion 74*a*, resulting in starter motor 134 rotating with comparatively higher, second cranking speed and comparatively lower, second cranking torque, which is suitable for warm starts.

Under warm-start operation of prior system 122, full starter motor current travels through main shorting relay switch 72, which is therefore required to accommodate high power levels. Full starter motor current can be as high as 500 A, so main shorting switch 72 must be designed with a 30 A coil to be able to reliably selectively switch the high, 500 A motor cold cranking current. Signals from ECU 150 are typically maximized at 2 A. Therefore, intermediate or warm-start control relay switch 82 is provided electrically between ECU 150 and main shorting relay switch 72. Intermediate control relay switch 82 has a 2 A coil receivable of (warm-start) flux level signal 70 from ECU 150 and is capable of switching 30 A. Typically, the 2 A relay switches 52 and 82 both have locations in the vehicle that are remote from starter assembly 132, especially in light-duty vehicle applications. The 30 A current signal relayed by intermediate control relay switch 82 closes high power main shorting relay switch 72, which selectively applies the short across starter motor field winding second portion 74*b* for warm-start operation.

In prior starter and switch system 122, during cold-start operation, when no signal 70 issues from ECU 150 (as indicated by the X across the respective terminal lead), intermediate control relay switch 82 remains open, and no 30 A current signal is relayed by intermediate control relay switch 82 to high power main shorting relay switch 72, which consequently also remains open. With main shorting relay switch 72 open, battery current passing through motor energizing switch 76 during starter activation is directed through both first portion 74*a* and second portion 74*b* of starter motor field winding 74 in series, resulting in starter motor 134 rotating with its low, first cranking speed and high, first cranking torque suitable for cold starts. Starter and switch system 122 thus provides warm-start capabilities with cold-start operation by default. Notably, these relatively lower cranking speed and higher torque cold-start operating conditions can also be applied to ring gear 30 for warm starts in the event of a system or component failure that results in the short across second starter motor field winding portion 74*b* failing to occur as desired, providing fail-safe starter operation.

Although prior variable flux starter and switch system 122 of FIGS. 2A and 2B successfully provides warm start capabilities, a continuing goal for OEM manufacturers and their suppliers is to reduce costs, improve reliability, and minimize the package space requirements of vehicle components. A variable flux starter and switch system that advances the art toward these goals is desirable.

SUMMARY

The present disclosure provides a variable flux starter and switch system that reduces costs and package space requirements, and improves reliability relative to prior such systems. A variable flux starter and switch system according to the present disclosure is applicable to vehicles having conventional internal combustion engines, vehicles having internal combustion engines provided with stop-start capabilities, and hybrid powertrains including such internal combustion engines.

Advantages provided by a variable flux starter and switch system according to the present disclosure relative to prior starter and switch system 122 include the following:

(1) two electrical relay switches 82, 72 are replaced by a single, non-relay switch-type regulating device;

(2) the OEM vehicle manufacturer (especially of light-duty vehicles) need only supply one remotely located relay switch instead of two remotely located relay switches 52, 82, with the prior remotely located relay switch for selectively varying the starter motor field winding flux, i.e., prior intermediate control relay switch 82, now eliminated in favor of the regulating device;

(3) the long wire from the ECU to the starter assembly now need only be rated for 2 A, and the 30 A wire from prior intermediate control relay switch 82 to high power main shorting relay switch 72 is eliminated, providing consequent cost savings;

(4) the 2 A regulating device, which may be incorporated into the starter assembly, is smaller and therefore cheaper than 30 A intermediate control relay switch 82 it replaces; and (5) the 2 A regulating device will draw less current than the relayed 30 A switching current used for actuating eliminated main shorting relay switch 72.

Thus, reductions in direct vehicle material and labor costs and attendant nondirect costs (e.g., for inventorying the eliminated component), improved vehicle reliability by eliminating wearable components, and decreased vehicle packaging space requirements for the starter assembly and switch system may be obtained with a starter and switch system according to the present disclosure.

The present disclosure provides a variable flux starter and switch system for starting an engine, including a starter assembly having a motor and a pinion gear. The pinion gear is rotatably drivable by the motor and operably engageable with the engine. The motor has an energizable field winding including first and second portions, and is selectively operable at different motor flux levels corresponding to the number of motor field winding portions energized. Consequently, at least one of the speed and torque with which the pinion gear is rotatably drivable varies between different motor flux levels. The system also includes a control unit capable of selectively issuing a starter activation signal indicative of desired starter assembly activation, and capable of selectively issuing a flux level signal indicative of a desired motor flux level. A motor energizing switch is provided that is in electrical communication with the motor field winding and operably connected to the control unit. The motor energizing switch has movement between open and closed positions consequent to issuance of the starter activation signal, and the motor field winding is energizable in the motor energizing switch closed position. The system also includes a regulating device in electrical communication with the motor field winding and operably connected to the control unit. The regulating device has a default operational state and an activated operational state, and the regulating device is transitioned from the default operational state to the activated operational state consequent to issuance of the flux level signal. The regulating device also includes a plurality of contact members having relative movement towards each other during closing of the motor energizing switch, and a moveable blocking member. Electrical contact between at least two contact members is prevented by the blocking member in one of the default and actuated operational states and is permitted by the blocking member in the other of the default and activated operational states. With electrical contact between the plurality of regulating device contact members permitted electric current conductible to the motor field winding through the closed motor energizing switch substantially bypasses the motor field winding second portion, whereby energization of the motor field winding at a first motor flux level substantially excludes energization of the motor field winding second portion. With electrical contact between at least two regulating device contact members prevented electric current conductible to the motor field winding through the closed motor energizing switch is conducted through both the motor field winding first and second portions, whereby energization of the motor field winding at a second motor flux level substantially includes energization of both of the motor field winding first and second portions.

According to a further aspect of the system, the first motor flux level corresponds to warm-start system operation and the second motor flux level corresponds to cold-start system operation, with pinion speed being relatively lower and pinion torque relatively higher under cold-start system operation than under warm-start system operation.

According to a further aspect of the system, the starter assembly includes a starter solenoid including a solenoid plunger having movement consequent to issuance of the starter activation signal. Electrical contact between the plurality of regulating device contact members defines an electrical short across the motor field winding second portion. One of the regulating device contact members is moveable by the solenoid plunger into electrical contact with another regulating device contact member in one of the regulating device default and activated operational states.

An additional aspect of the system is that the plurality of contact members includes a contact plate carried by the solenoid plunger and a fixed pair of spaced contact pads housed by the starter solenoid.

An additional aspect of the system is that energization of the starter solenoid is consequent to issuance of the starter activation signal, and a regulating device contact member is carried by the solenoid plunger. In one of the regulating device default and activated operational states, the regulating device contact member carried by the solenoid plunger is permitted to electrically contact another regulating device contact member during solenoid plunger movement. In the other of the regulating device default and activated operational states, the regulating device contact member carried by the solenoid plunger is prevented by the blocking member from electrically contacting another regulating device contact member during solenoid plunger movement.

Another aspect of the system is that the regulating device blocking member is selectively disposed in and outside of the path of relative movement of the regulating device contact members towards each other. Consequently, electrical contact therebetween is respectively prevented and permitted during solenoid plunger movement.

Furthermore, an aspect of the system is that the blocking member has an extended position in which it is disposed in the path of relative movement of the regulating device contact members towards each other and a retracted position in which it is disposed outside of the path of relative movement of the regulating device contact members towards each other, with movement of the blocking member between its extended and retracted positions consequent to issuance of the flux level signal.

Another aspect of the system is that in the regulating device activated operational state the regulating device contact member carried by the solenoid plunger is permitted to electrically contact another regulating device contact member during solenoid plunger movement. Consequently, system operation at the first motor flux level is facilitated consequent to issuance of the flux level signal. In the regulating device default operational state the regulating device contact member carried by the solenoid plunger is prevented from electrically contacting another regulating device contact member during solenoid plunger movement. Consequently, system operation at the second motor flux level is facilitated in the absence of flux level signal issuance.

Another aspect of the system is that in the regulating device default operational state the regulating device contact member carried by the solenoid plunger is permitted to electrically contact another regulating device contact member during solenoid plunger movement. Consequently, system operation at the second motor flux level is facilitated consequent to issuance of the flux level signal. In the regulating device activated operational state the regulating device contact member carried by the solenoid plunger is prevented from electrically contacting another regulating device contact member during solenoid plunger movement. Consequently, system operation at the first motor flux level is facilitated in the absence of flux level signal issuance.

According to a further aspect of the system, electrical contact between the plurality of regulating device contact members defines an electrical short across the motor field winding second portion. In the regulating device default operational state electrical contact between the plurality of regulating device contact members is prevented by the blocking member. Consequently, the system facilitates operation at the second motor flux level by default.

According to a further aspect of the system, electrical contact between the plurality of regulating device contact members defines a short across the motor field winding second portion. In the regulating device activated operational state electrical contact between the plurality of regulating device contact members is prevented by the blocking member. Consequently, the system facilitates operation at the first motor flux level by default.

According to a further aspect of the system, electrical contact between the plurality of regulating device contact members defines a short across the motor field winding second portion, and the regulating device blocking member is selectively moveable between a retracted position wherein electrical contact between the plurality of regulating device contact members with the motor energizing switch closed is permitted by the blocking member, and an extended position wherein electrical contact between the plurality of regulating device contact members with the motor energizing switch closed is prevented by the blocking member.

An additional aspect of the system is that the regulating device includes a solenoid mechanism including a moveable blocking plunger, movement of the blocking member imparted by movement of the blocking plunger. The blocking member is biased into the blocking member extended position and moveable into the blocking member retracted position consequent to receipt by the solenoid mechanism of the issued flux level signal.

An additional aspect of the system is that the regulating device includes a solenoid mechanism including a moveable blocking plunger, movement of the blocking member imparted by movement of the blocking plunger. The blocking member is biased into the blocking member retracted position and moveable into the blocking member extended position consequent to receipt by the solenoid mechanism of the issued flux level signal.

According to a further aspect of the system, the starter assembly include at least one of the motor energizing switch and the regulating device.

According to a further aspect of the system, the starter assembly includes a starter solenoid affixed to the motor. The starter solenoid includes a solenoid plunger having axial movement generally parallel with the axis of motor rotation, and the starter assembly includes at least one of the motor energizing switch and the regulating device.

An additional aspect of the system is that the starter solenoid includes at least one of the motor energizing switch and the regulating device.

The present disclosure also provides a method for varying starter motor flux levels between a first motor flux level, and a second motor flux level having a relatively lower pinion speed and relatively higher pinion torque. The method includes the steps of: selectively issuing a starter activation signal indicative of desired starter assembly activation with a control unit; selectively issuing a flux level signal indicative of a desired motor flux level with a control unit; selectively transitioning a regulating device between default and activated operational states consequent to the absence or issuance of a flux level signal; closing a motor energizing switch in electrical communication with the motor field winding consequent to issuance of the starter activation signal; energizing the motor field winding with current passed through the closed motor energizing switch; relatively moving at least two regulating device contact members toward each other during closing of the motor energizing switch; permitting electrical contact between a plurality of regulating device contact members with the motor energizing switch closed to define an electrical short across one of a pair of portions of the motor field winding in one of the regulating device default and activated operational states, to facilitate starter assembly operation at the first motor flux level; and preventing electrical contact between at least two regulating device contact members with the motor energizing switch closed to prevent an electrical short across said one motor filed winding portion in the other of the regulating device default and activated operational states by interposing a blocking member between at least two of the regulating device contact members, to facilitate starter assembly operation at the second motor flux level.

According to a further aspect of the method, it also includes the steps of: closing the motor energizing switch by activating a starter solenoid consequent to issuance of the motor activation signal; and relatively moving at least two regulating device contact members towards each other with the solenoid plunger of the activated starter solenoid.

According to a further aspect of the method, it also includes the step of: abutting one of the regulating device contact members against the blocking member during closing of the motor energizing switch in said other of the regulating device default and activated operational states, to facilitate starter assembly operation at the second motor flux level.

BRIEF DESCRIPTION OF THE DRAWINGS

The above-mentioned aspects and other characteristics and advantages of an apparatus and/or method according to the present disclosure will become more apparent and will be better understood by reference to the following description of exemplary embodiments taken in conjunction with the accompanying drawings, wherein.

Figure 1:
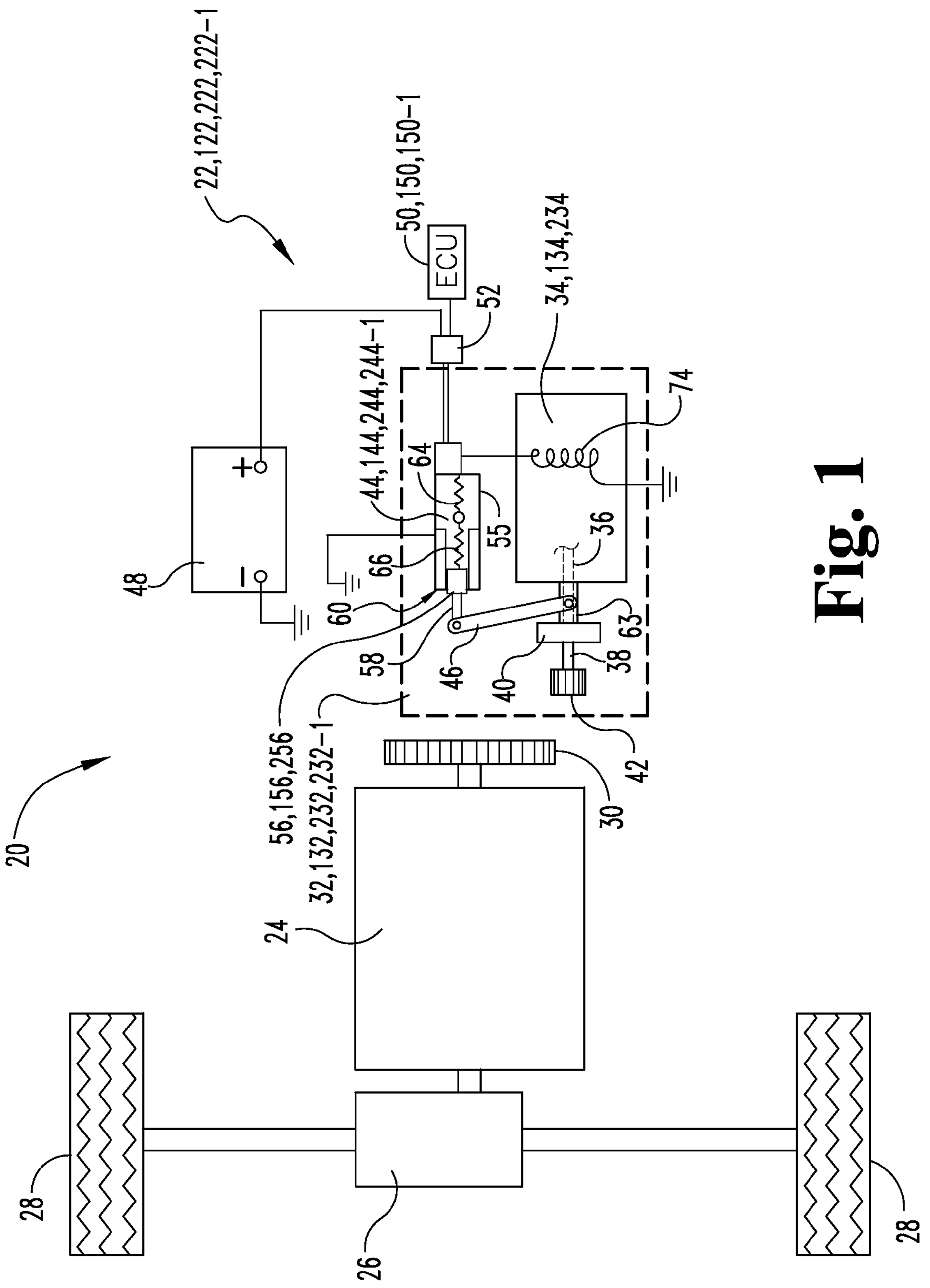
FIG. 1 is a schematic view of a vehicle with a generic starter and switch system according to the prior art or the present disclosure.

Corresponding reference characters indicate corresponding parts throughout the several views. Although the drawings represent an embodiment of the disclosed apparatus, system and/or method, the drawings are not necessarily to scale or to the same scale and certain features may be exaggerated in order to better illustrate and explain the present disclosure. Moreover, in accompanying drawings that show sectional views, cross-hatching of various sectional elements may have been omitted for clarity. It is to be understood that any omission of cross-hatching is for the purpose of clarity in illustration only.

DETAILED DESCRIPTION OF EXEMPLARY EMBODIMENT(S)

The embodiments of the present disclosure are not intended to be exhaustive or to limit the invention to the precise forms or steps disclosed in the following detailed description, but have been chosen and are herein described so that others skilled in the art may appreciate and understand principles and practices according to the present disclosure. It is, therefore, to be understood that the invention herein described is not limited in its application to the details of construction and the arrangement of components or steps set forth in the following description or illustrated in the drawings, and is capable of having other embodiments and of being practiced or of being carried out in various ways.

Figure 3A:
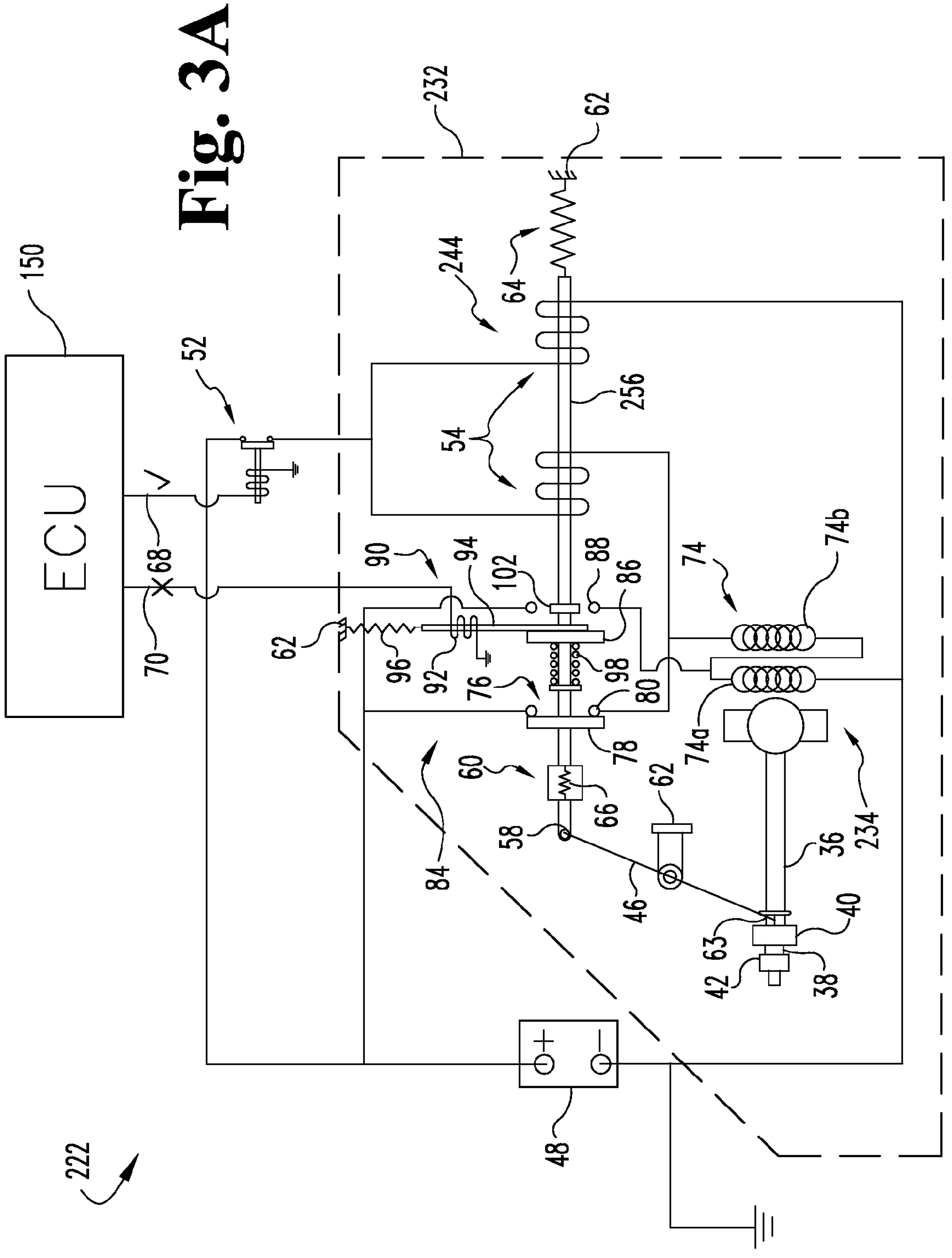
FIG. 3A is a schematic view of a first embodiment starter and switching system having warm start capabilities with default cold-start operation according to the present disclosure, showing the starter activated and no ECU warm-start signal being issued, whereby no electrical shorting occurs across a portion of the starter motor field winding and default cold-start operation is being facilitated.
Figure 3B:
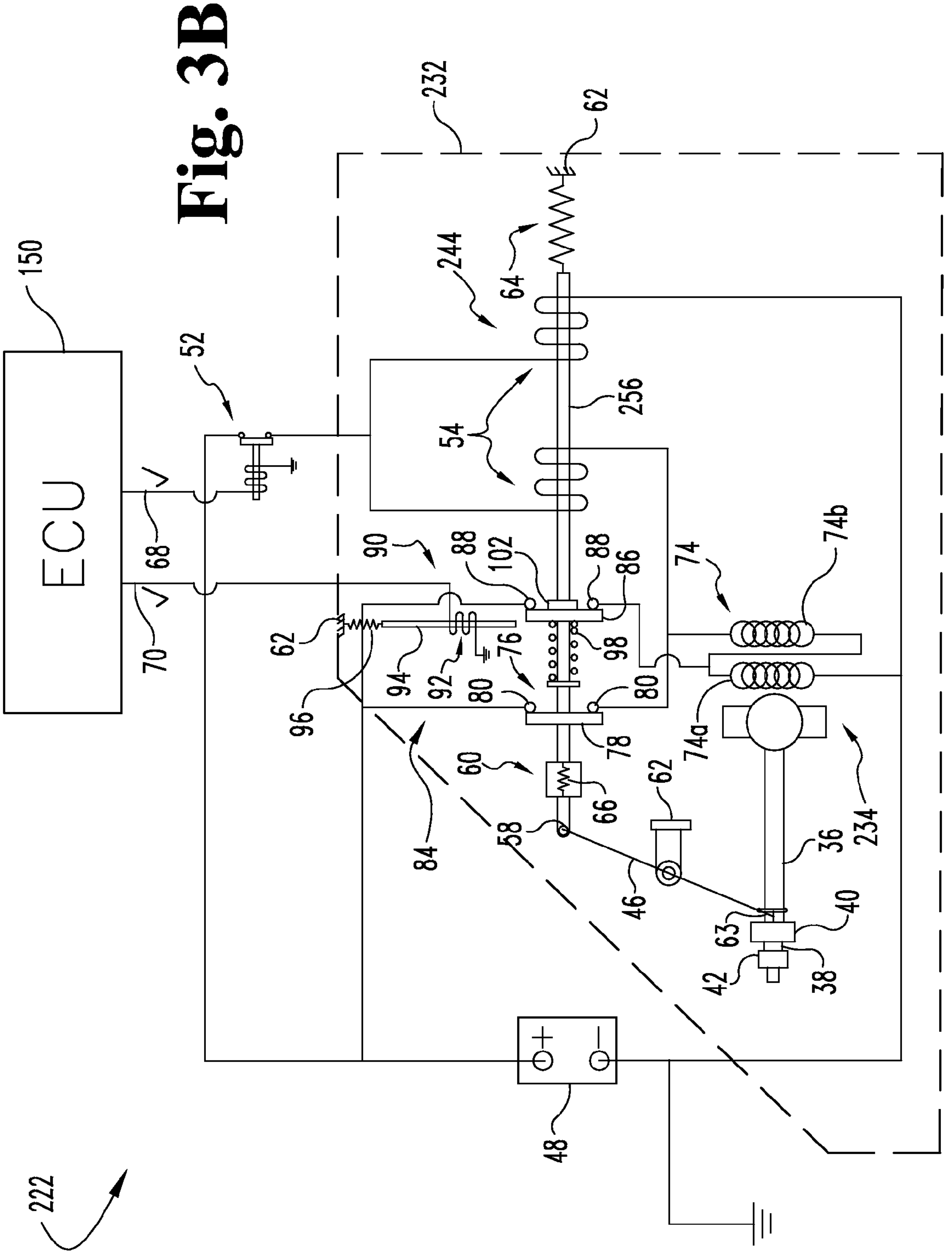
FIG. 3B is a schematic view of the first embodiment starter and switching system of FIG. 3A, showing the starter activated and an ECU warm-start signal being issued, whereby electrical shorting occurs across a portion of the starter motor field winding and warm-start operation is being facilitated.
Figure 4A:
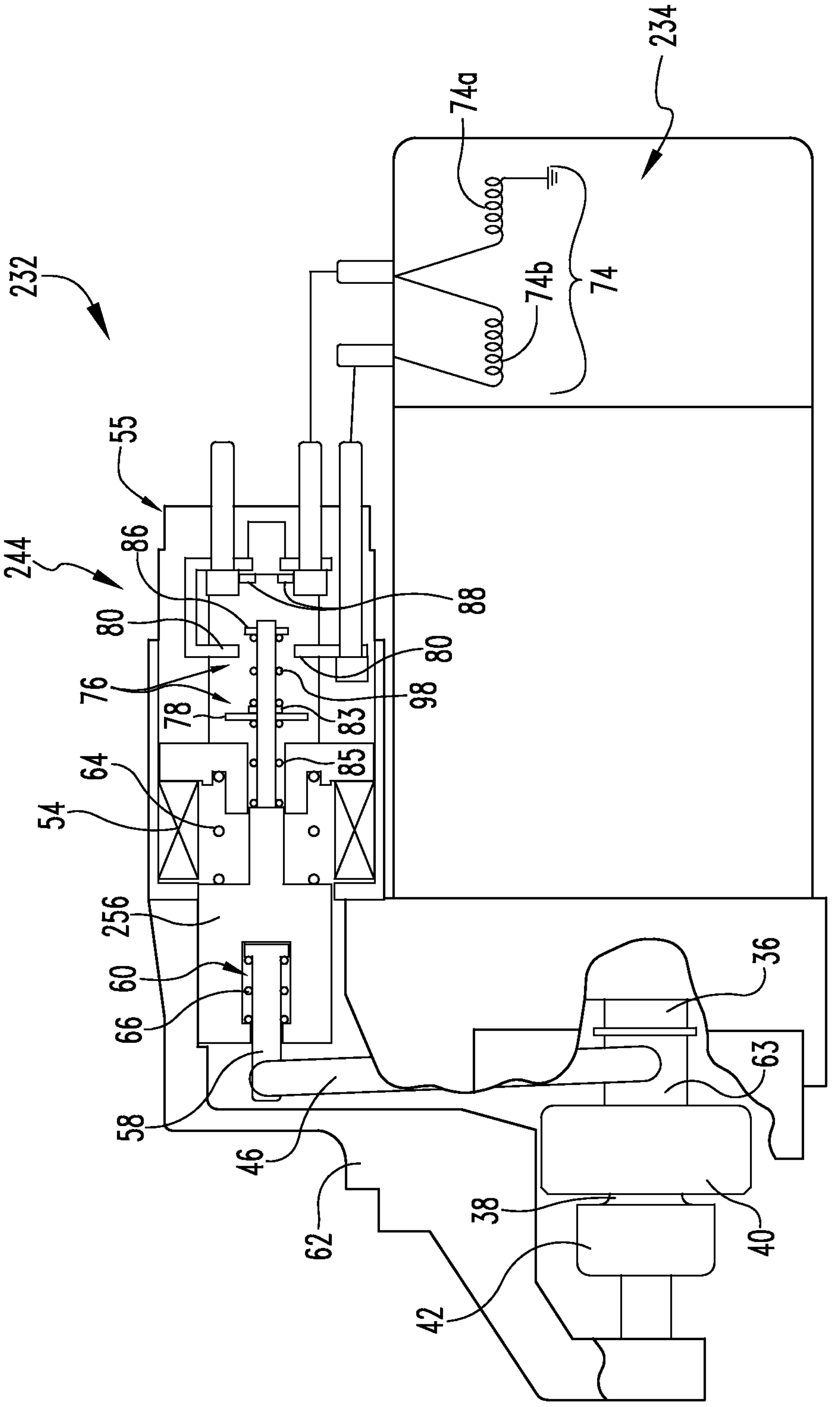
FIG. 4A is a cross-sectional side view of a starter assembly according to a first embodiment of the present disclosure and exemplary of that used in the system shown in FIGS. 3A and 3B, wherein the starter assembly is not activated and its pinion gear is in the starter's fully retracted, home position.

Variable flux starter and switch system 222 according to a first system embodiment of the present disclosure is shown in FIGS. 3A and 3B. FIGS. 4A through 6B provide various views and operational states of exemplary starter assembly 232 according to a first starter embodiment of the present disclosure, which may be utilized in first embodiment starter and switch system 222, wherein cold-start operation is facilitated by default. FIG. 3A shows system 222 in its default, cold-start operating condition, with no flux level signal 70 issuing from ECU 150, as indicated by the X across the lead from the respective ECU terminal. FIG. 3B shows system 222 in a warm-start operating condition responsive to a flux level signal 70 issuing from ECU 150, as indicated by the check mark (✓) near the respective terminal.

Figure 2A:
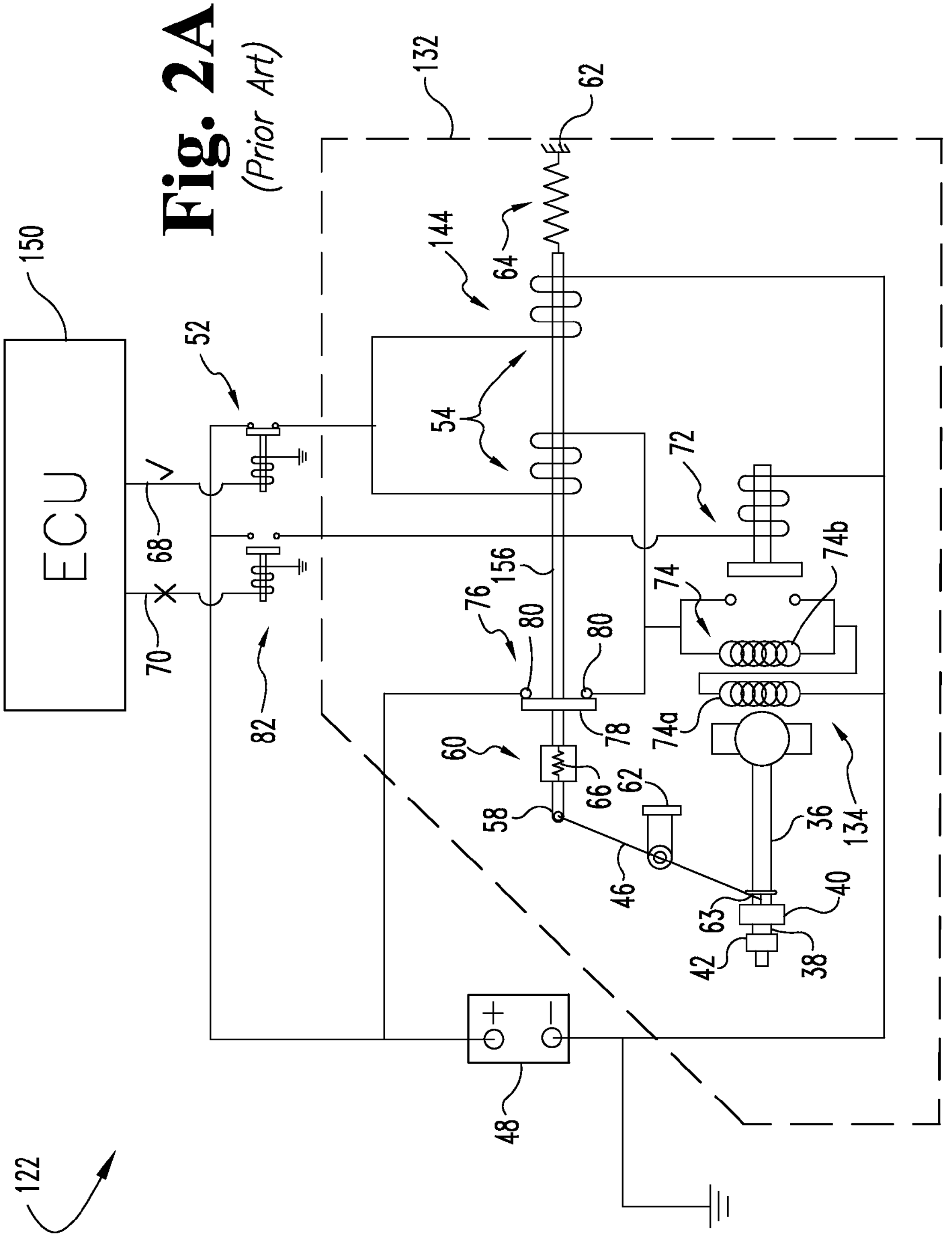
Fig. 2A (Prior Art)
FIG. 2A is a schematic view of a prior starter and switching system having warm start capabilities, showing the starter activated and no ECU warm-start signal being issued, whereby no electrical shorting occurs across a portion of the starter motor field winding and cold-start operation is being facilitated.
Figure 2B:
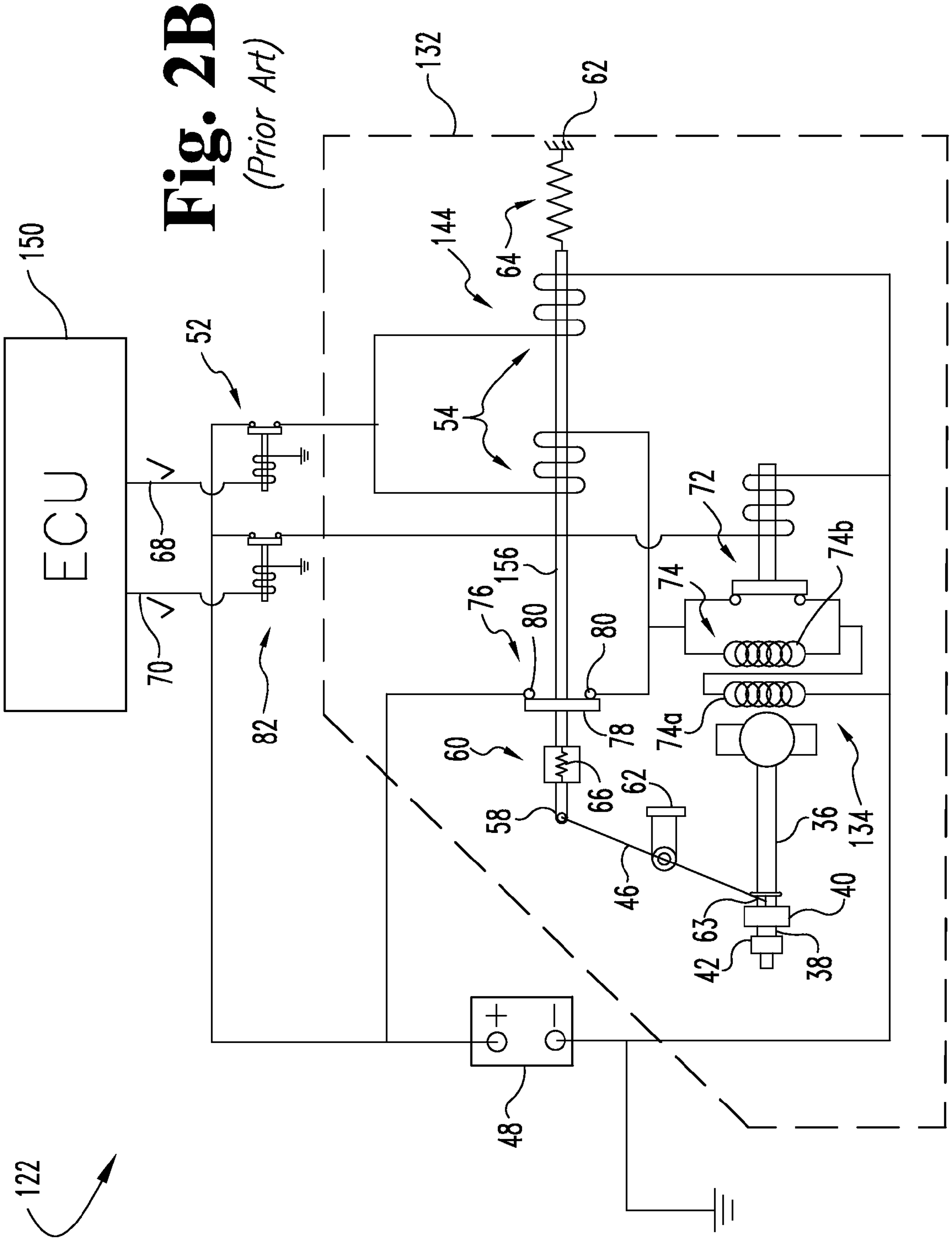
Fig. 2B (Prior Art)
FIG. 2B is a schematic view of the prior starter and switching system of FIG. 2A, showing the starter activated and the ECU warm-start signal being issued, whereby electrical shorting occurs across a portion of the starter motor field winding and warm-start operation is being facilitated.

Relative to prior system 122 shown in FIGS. 2A and 2B, first embodiment system 222 replaces prior starter assembly 132 with first embodiment starter assembly 232 having starter motor 234 and starter solenoid 244 which includes solenoid plunger 256. Furthermore, unlike prior system 122, which relies on separate and remotely distanced intermediate control relay switch 82 and high power main shorting relay switch 72 to selectively establish the short across motor field winding second portion 74*b*, system 222 facilitates switching control over whether starter motor field winding second portion 74*b* is to be shorted without relay switches. In system 222, the magnetic flux created by field winding 74 of starter motor 234 is selectively varied between higher and lower motor flux levels through regulating device 84. System 222 eliminates high power main shorting relay switch 72 and intermediate control relay switch 82 of prior system 122. In system 222, control by which an electrical short is selectively provided over stator motor filed winding second portion 74*b* is accomplished through regulating device 84, a non-relay type switching device actuated by warm-start signal 70 issuing from ECU 150. FIGS. 3A and 3B both show starter assembly 232 of system 222 with motor 234 and solenoid 244 of starter assembly 232 activated, a condition resulting from starter relay switch 52 receiving a starter activation signal 68 issuing from ECU 150, which is indicated by the check mark (✓) near its respective terminal.

As in prior variable flux starter and switch system 122, system 222 includes motor energizing switch 76 having (first) contact plate 78 and contact pads 80, with contact plate 78 carried by the starter solenoid plunger. Motor energizing switch 76 closes upon electrical contact being made between its contact plate 78 and its contact pads 80, which results from energization of starter solenoid coil 54 and resulting retracting movement of the solenoid plunger. Contact plate 78 and the solenoid plunger may have relative axial movement, with contact plate 78 biased towards contact pads 80 and against stop 83 provided on the plunger with compression spring 85. Hence, an amount further retracting movement of the solenoid plunger may occur subsequent to the engagement between contact plate 78 and contact pads 80.

Regulating device 84 includes a fixed pair of separated contact pads 88, and a second contact plate 86 which, like first contact plate 78, is carried by solenoid plunger 256. Movement of second contact plate 86 into electrical contact with contact pads 88 is selectively physically blocked. Contact plate 86 and solenoid plunger 256 have relative axial movement, with contact plate 86 biased towards contact pads 88 and against stop 102 on the plunger with compression spring 98. Contact plate 86 may be mounted to solenoid plunger 256 such that plate 86 and plunger 256 have relative movement along the axis of plunger movement. Contact plate 86 of regulating device 84 is biased axially along solenoid plunger 256 by compression spring 98 disposed between stop 83 and contact plate 86 towards stop 102, which limits the travel of contact plate 86. Stop 102 may pass between contact pads 88 of regulating device 84 during movement of solenoid plunger 256. Thus, some further retracting movement of the solenoid plunger subsequent to engagement between contact plate 86 and contact pads 88 is permitted. Engagement of contact plate 86 with contact pads 88 closes a battery circuit that shorts starter motor field winding second portion 74*b*, thereby reducing the flux generated by starter motor 234 and resulting in warm-start operation of starter assembly 232, i.e., operation at a relatively higher speed and a relatively lower torque than its speed and torque exhibited during cold-start operation. As shown, regulating device 84 may be disposed within solenoid housing 55, and operatively responds to flux level signal 70 issuing from ECU 150. Blocking the movement of contact plate 86 towards contact pads 88 prevents their engagement, which prevents the short across motor field winding second portion 74*b* from occurring and thereby causes battery current passed through motor energizing switch 76 to be directed through both starter motor field winding first portion 74*a* and second portion 74*b*, resulting in cold-start operation of starter 232.

Figure 6B:
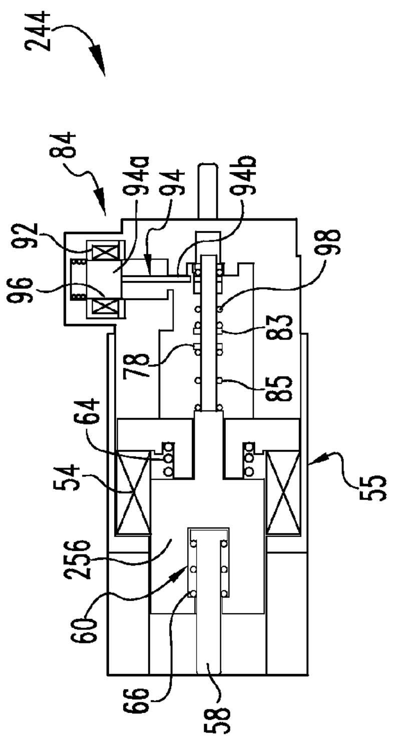
FIG. 6B is a cross-sectional view taken along line 6B-6B FIG. 4B.
Figure 4B:
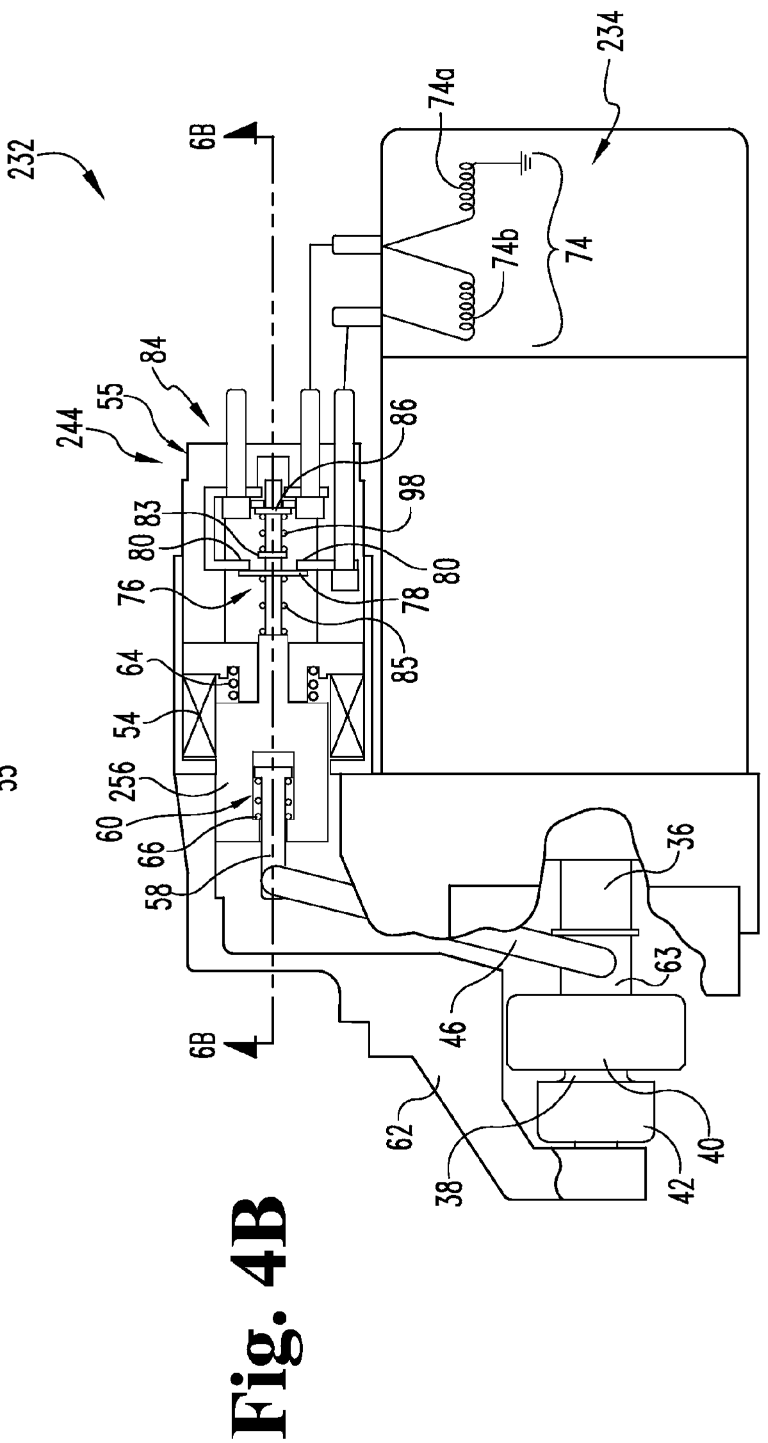
FIG. 4B is a similar view of the first embodiment starter assembly of FIG. 4A but showing the starter activated and its pinion gear in the starter's fully extended, engagement position.
Figure 6A:
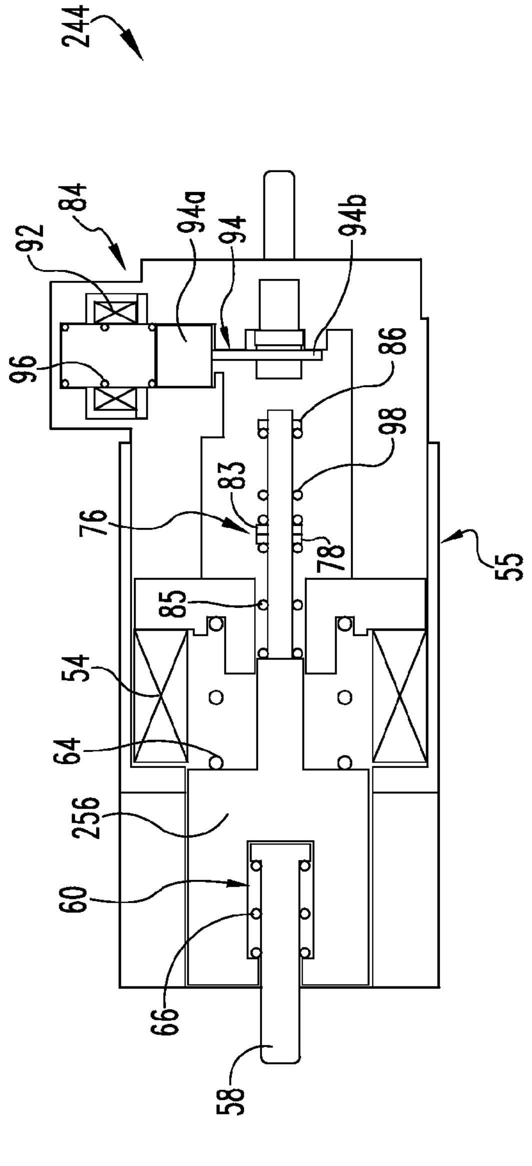
FIG. 6A is a cross-sectional view taken along line 6A-6A of FIG. 5.
Figure 5:
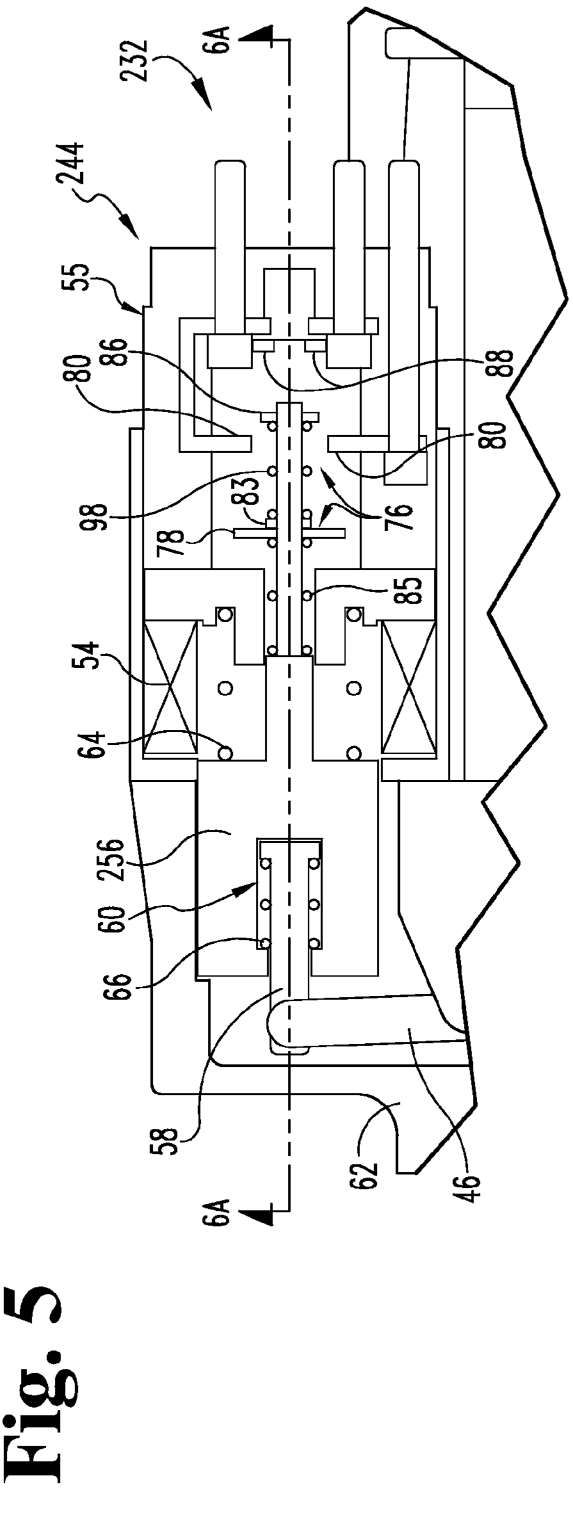
FIG. 5 is an enlarged, fragmented cross-sectional side view of the solenoid assembly of the starter assembly of FIG. 4A.

Selective blocking of the movement of contact plate 86 into contact with contact pads 88 is accomplished by solenoid mechanism 90 of regulating device 84. Solenoid mechanism 90 includes 2 A solenoid coil 92 selectively energized by (warm-start) flux level signal 70 issuing from ECU 150, and a blocking member in the form of elongate blocking plunger 94 having a body portion 94*a* and a blocking portion 94*b* extending axially from the body portion 94*b* and defining a blocking member. Blocking plunger 94 has an extended position and a retracted position. In its extended position, blocking portion 94*b* is located between second contact plate 86 and contact pads 88, whereby movement of second contact plate 86 with retracting solenoid plunger 256 towards contact pads 88 is blocked. In the retracted position of blocking plunger 94, blocking portion 94*b* is located out of the path of movement of contact plate 86 towards contact pads 88, and does not impede their engagement during the retracting movement of solenoid plunger 256, permitting electrical contact therebetween. In regulating device 84, blocking plunger 94 is biased by compression blocking plunger return spring 96 into its extended position. Referring to FIG. 6A, in regulating device 84, compression blocking plunger return spring 96 abuts cylindrical blocking plunger body portion 94*a* on its axial end located opposite blocking plunger blocking portion 94*b*, and biases blocking plunger 94 downward into its extended position, wherein electrical contact between contact plate 86 and contact pads 88 is prevented, thereby preventing a short across starter motor field winding second portion 74*b* and facilitating cold-start operation.

Blocking portion 94*b* of blocking plunger 94 may be made out of plastic, steel, or another suitable material, but electrically conductive material that may be used in blocking portion 94*b* is electrically insulated from ground or from solenoid plunger 256. Plastic nubs may be located on directly behind blocking portion 94*b* so that blocking portion 94*b* does not bear the full bending moment force imparted on it by contact plate 86.

Referring to FIG. 3A, absent (warm-start) flux level signal 70 issuing from ECU 150, as indicated by the X across the lead from the respective ECU terminal, solenoid coil 92 is not energized and blocking plunger 94 remains disposed in its extended position under the influence of biasing compression spring 96. As in FIG. 2A, though signal 70 is absent in FIG. 3A, reference numeral 70 indicates the respective flux level signal terminal of ECU 150. During retracting movement of solenoid plunger 256 during activation of starter 232 in response to a starter activation signal issuing from ECU terminal 68, first contact plate 78 of motor energizing switch 76 and second contact plate 86 of regulating device 84 are moved with plunger 256. Second contact plate 86 is brought into abutment with portion 94*b* of blocking plunger 94 and prevented from establishing a short between spaced contact pads 88, which prevents a short being established across starter motor field winding second portion 74*b*. Upon abutment of contact plate 86 with blocking plunger 94, contact plate spring 98 compresses, allowing further movement of plunger 256 and first contact plate 78, which is followed by closure of motor energizing switch 76 upon first contact plate 78 being brought into engagement with contact pads 80 of motor energizing switch 76. Full battery current passed through switch 76, when closed, is directed through both first and second portions 74*a*, 74*b* of starter motor field winding 74, resulting in cold-start operation of starter assembly 232. Thus, regulating device 84 facilitates cold-start operation by default in starter and switch system 222.

In response to flux level signal 70 issuing from ECU 150, blocking plunger 94 is retracted against the biasing force of return compression spring 96, which removes blocking portion 94*b* from the path of movement of contact plate 86 towards contact pads 88 during starter activation, thereby permitting contact plate 86 to engage contact pads 88 during retracting movement of solenoid plunger 256, which provides shorting across starter motor field winding second portion 74*b* and warm-start operation of starter assembly 232.

Figure 7A:
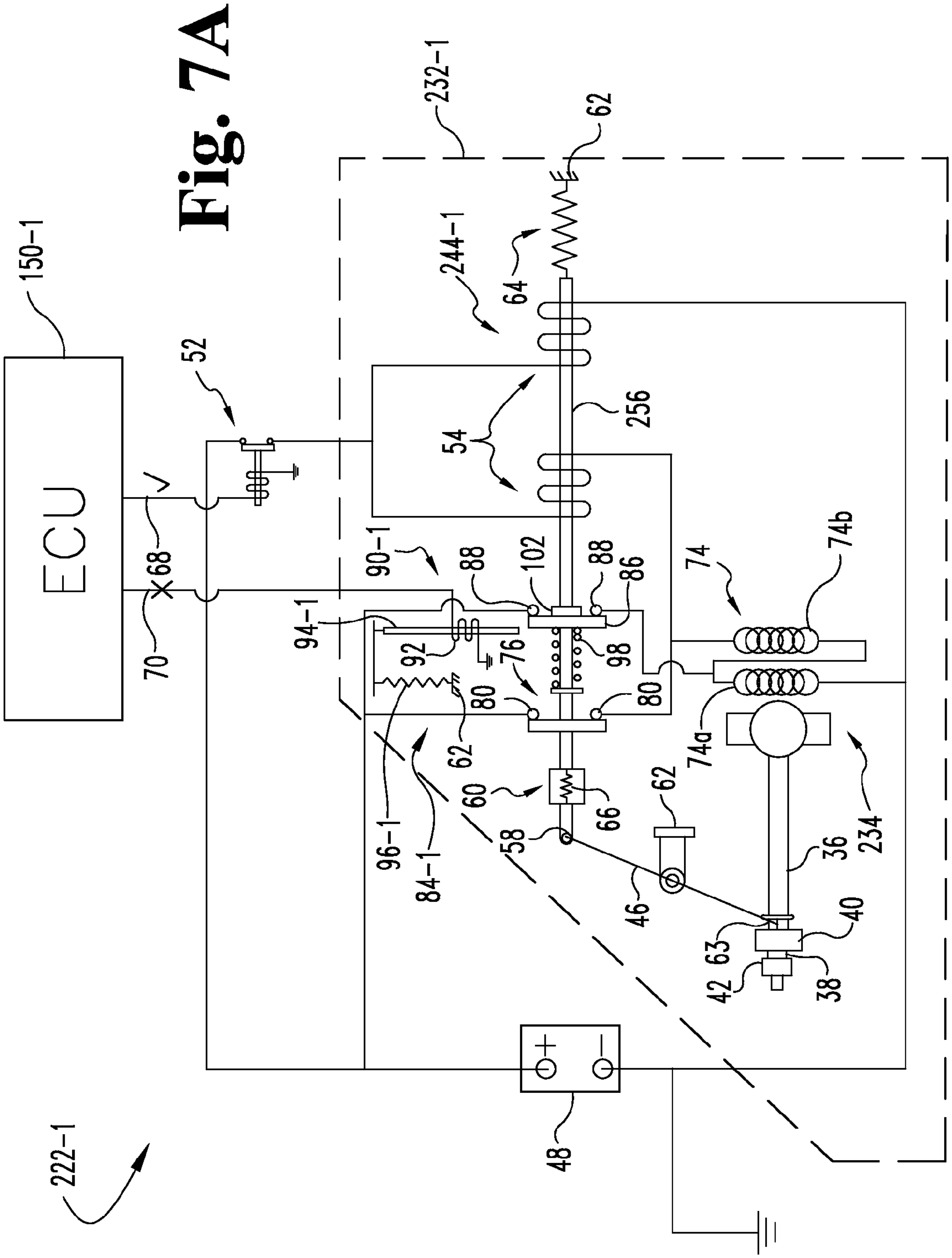
FIG. 7A is a schematic view of a second embodiment starter and switching system having warm start capabilities with default warm-start operation according to the present disclosure, showing the starter activated and no ECU cold-start signal being issued, whereby electrical shorting occurs across a portion of the starter motor field winding and default warm-start operation is being facilitated.
Figure 7B:
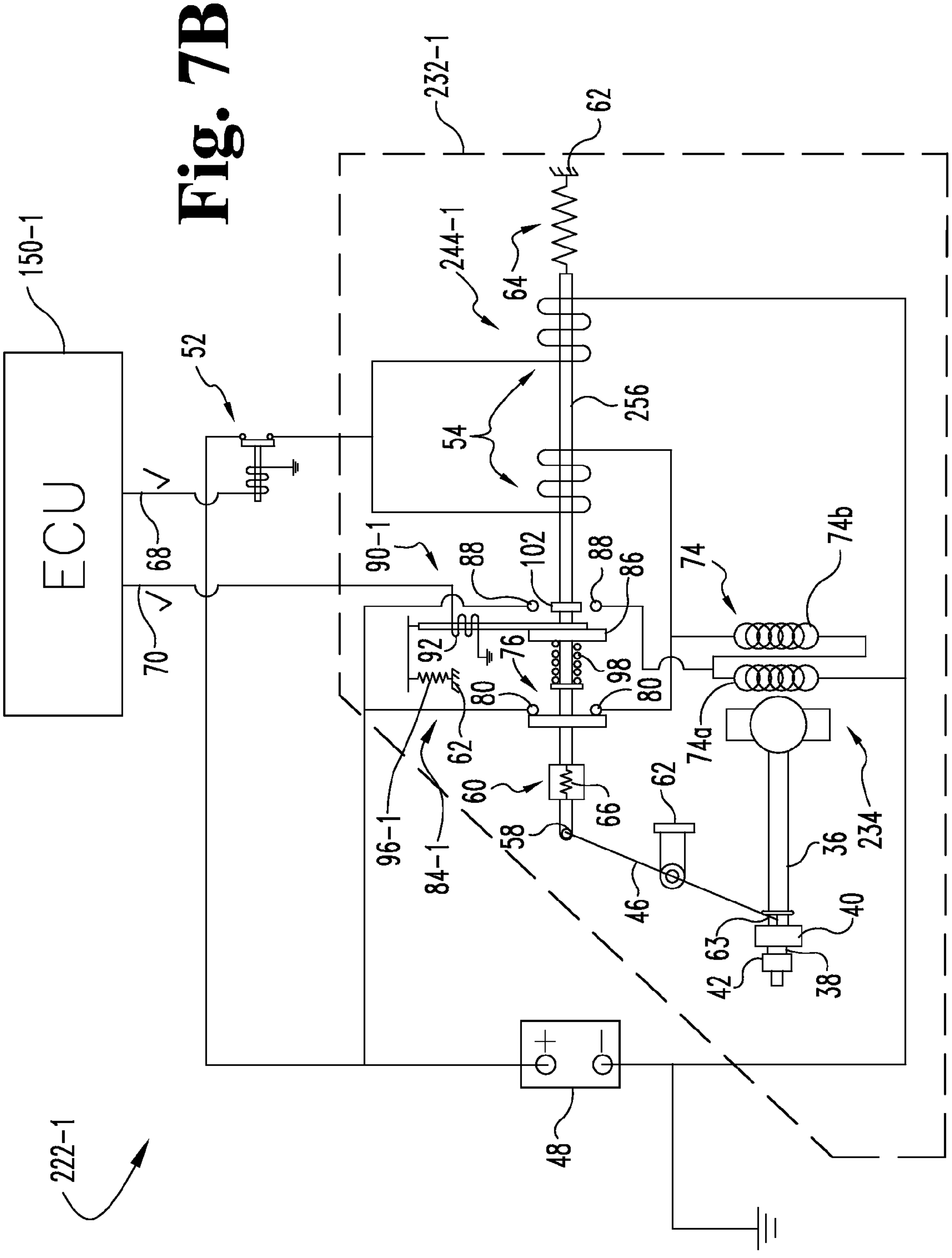
FIG. 7B is a schematic view of the second embodiment starter and switching system of FIG. 7A, showing the starter energized and the ECU cold-start signal being issued, whereby no electrical shorting occurs across a portion of the starter motor field winding and cold-start operation is being facilitated.

A second embodiment of a variable flux starter and switch system according to the present disclosure is shown in FIGS. 7A and 7B. The reference numerals of this second embodiment system, and components thereof substantively differing from corresponding components of first embodiment system 222 are provided with suffix "-1". Second embodiment variable flux starter and system 222-1 includes regulating device 84-1 that includes solenoid mechanism 90-1. Blocking plunger 94-1 of solenoid mechanism 90-1 is biased by compression blocking plunger return spring 96-1 into its retracted position and out of the path of movement of contact plate 86. The default, retracted position of blocking plunger 94-1 shown in FIG. 7A occurs when no flux level signal 70 issues from ECU 150-1, as indicated by the X across the lead from the respective ECU terminal. As in FIGS. 2A and 3A, though signal 70 is absent in FIG. 7A, reference numeral 70 indicates the respective flux level signal terminal of the ECU. When retracted under the influence of spring 96-1, blocking plunger 94-1 allows movement of contact plate 86 towards and into electrical contact with contact pads 88 during activation of starter 232-1, resulting in an electrical short being provided across starter motor field winding second portion 74*b*. Referring to FIGS. 6A and 6B, which show regulating device 84, it can be readily understood that in regulating device 84-1, compression blocking plunger return spring 96-1 may, for example, be positioned to abut cylindrical blocking plunger body portion 94*a* of blocking plunger 94-1 on the same axial end as that from which blocking portion 94*b* extends to bias blocking plunger 94-1 upward into its retracted position. In the retracted position of blocking plunger 94-1, electrical contact between contact plate 86 and contact pads 88 is permitted, thereby facilitating a short across starter motor field winding second portion 74*b* and facilitating warm-start operation. Thus, system 222-1 provides warm-start operation by default. Conversely, in response to (cold-start) flux level signal 70 issuing from ECU 150-1, as indicated by the check mark (✓) near the respective ECU terminal, coil 92 of solenoid mechanism 90-1 is energized, which extends blocking plunger 94-1 downwardly, as viewed in FIG. 7B, into the path of contact plate 86, and prevents electrical contact between contact plate 86 and contact pads 88 and shorting across starter motor field winding second portion 74*b*, resulting in cold-start operation.

Thus, the default starter operating condition that occurs when no flux level signal 70 issues from the ECU differs between first embodiment starter and switch system 222 and second embodiment starter and switch system 222-1: first embodiment system 222 facilitates cold-start operation by default; second embodiment system 222-1 facilitates warm-start operation by default.

Therefore, first embodiment system 222 may be implemented without a revision to ECU 150 used in prior starter and switch system 122, and energizers solenoid mechanism 90 to move blocking plunger 94 against the biasing force of compression blocking plunger return spring 96 to permit contact between second contact plate 86 and contact pads 88. This facilitates a short across motor field winding second portion 74*b* and warm-start operation only upon issuance of (warm-start) flux level signal 70 by ECU 150. The system 222 default, with no signal 70 issuing from ECU 150 to activate blocking solenoid coil 92 of regulating device 84, is cold-start operation. Notably, the relatively lower cranking speed and higher torque cold-start operating conditions can also be applied to ring gear 30 for warm starts in the event of a system or component failure that results in the short across second starter motor field winding portion 74*b* failing to occur as desired, providing fail-safe starter operation with system 222, as with prior system 122.

Conversely, in second embodiment system 222-1, ECU 150-1 energizes solenoid mechanism 90-1 upon issuance of (cold-start) flux level signal 70 from the ECU, to move blocking plunger 94-1 against the biasing force of compression blocking plunger return spring 96-1 and into the path of movement of contact plate 86 toward contact pads 88, to prevent shorting between contact pads 88 and of starter motor field winding second portion 74*b*, thereby facilitating cold-start operation. The system 222-1 default, with no signal 70 issuing from ECU 150-1 to activate blocking solenoid coil 92 of regulating device 84-1, is warm-start operation. The low-torque, warm-start performance which may result from failure of ECU 150-1 and/or regulating device 84-1, may be inadequate to start a cold engine, and so first embodiment starter and switch system 222 may better assure cold starting of engine 24 of vehicle 20, vis-à-vis second embodiment starter and switch system 222-1.

While exemplary embodiments have been disclosed hereinabove, the invention is not necessarily limited to the disclosed embodiments. Instead, this application is intended to cover any variations, uses, or adaptations of the present disclosure using its general principles. Further, this application is intended to cover such departures from the present disclosure as come within known or customary practice in the art to which this present disclosure pertains and which fall within the limits of the appended claims.

What is claimed is:

1. A variable flux starter and switch system for starting an engine, comprising:

a starter assembly having a motor and a pinion gear, the pinion gear rotatably drivable by the motor and operably engageable with the engine, the motor having an energizable field winding including first and second portions, the motor selectively operable at different motor flux levels corresponding to the number of motor field winding portions energized whereby at least one of the speed and torque with which the pinion gear is rotatably drivable varies between different motor flux levels;

a control unit capable of selectively issuing a starter activation signal indicative of desired starter assembly activation, and capable of selectively issuing a flux level signal indicative of a desired motor flux level;

a motor energizing switch in electrical communication with the motor field winding and operably connected to the control unit, the motor energizing switch having movement between open and closed positions consequent to issuance of the starter activation signal, the motor field winding energizable in the motor energizing switch closed position; and a regulating device in electrical communication with the motor field winding and operably connected to the control unit, the regulating device having a default operational state and an activated operational state, the regulating device transitioned from the default operational state to the activated operational state consequent to issuance of the flux level signal, the regulating device comprising a plurality of contact members having relative movement towards each other during closing of the motor energizing switch, and a moveable blocking member, electrical contact between at least two contact members prevented by the blocking member in one of the default and actuated operational states, electrical contact between the plurality of contact members permitted by the blocking member in the other of the default and actuated operational states;

wherein with electrical contact between the plurality of regulating device contact members permitted electric current conductible to the motor field winding through the closed motor energizing switch substantially bypasses the motor field winding second portion whereby energization of the motor field winding at a first motor flux level substantially excludes energization of the motor field winding second portion, and with electrical contact between at least two regulating device contact members prevented electric current conductible to the motor field winding through the closed motor energizing switch is conducted through both the motor field winding first and second portions whereby energization of the motor field winding at a second motor flux level substantially includes energization of both of the motor field winding first and second portions.

2. The system of claim 1, wherein the first motor flux level corresponds to warm-start system operation and the second motor flux level corresponds to cold-start system operation, with pinion speed being relatively lower and pinion torque relatively higher under cold-start system operation than under warm-start system operation.

3. The system of claim 1, wherein the starter assembly comprises a starter solenoid including a solenoid plunger having movement consequent to issuance of the starter activation signal, electrical contact between the plurality of regulating device contact members defines an electrical short across the motor field winding second portion, and one of the regulating device contact members is moveable by the solenoid plunger into electrical contact with another regulating device contact member in one of the regulating device default and activated operational states.

4. The system of claim 3, wherein the plurality of contact members includes a contact plate carried by the solenoid plunger and a fixed pair of spaced contact pads housed by the starter solenoid.

5. The system of claim 3, wherein energization of the starter solenoid is consequent to issuance of the starter activation signal, a regulating device contact member is carried by the solenoid plunger, in one of the regulating device default and activated operational states the regulating device contact member carried by the solenoid plunger is permitted to electrically contact another regulating device contact member during solenoid plunger movement, and in the other of the regulating device default and activated operational states the regulating device contact member carried by the solenoid plunger is prevented by the blocking member from electrically contacting another regulating device contact member during solenoid plunger movement.

6. The system of claim 5, wherein the regulating device blocking member is selectively disposed in and outside of the path of relative movement of the regulating device contact members towards each other, whereby electrical contact therebetween is respectively prevented and permitted during solenoid plunger movement.

7. The system of claim 6, wherein the blocking member has an extended position in which it is disposed in the path of relative movement of the regulating device contact members towards each other and a retracted position in which it is disposed outside of the path of relative movement of the regulating device contact members towards each other, movement of the blocking member between its extended and retracted positions consequent to issuance of the flux level signal.

8. The system of claim 5, wherein in the regulating device activated operational state the regulating device contact member carried by the solenoid plunger is permitted to electrically contact another regulating device contact member during solenoid plunger movement whereby system operation at the first motor flux level is facilitated consequent to issuance of the flux level signal, and in the regulating device default operational state the regulating device contact member carried by the solenoid plunger is prevented from electrically contacting another regulating device contact member during solenoid plunger movement whereby system operation at the second motor flux level is facilitated in the absence of flux level signal issuance.

9. The system of claim 5, wherein in the regulating device default operational state the regulating device contact member carried by the solenoid plunger is permitted to electrically contact another regulating device contact member during solenoid plunger movement whereby system operation at the second motor flux level is facilitated consequent to issuance of the flux level signal, and in the regulating device activated operational state the regulating device contact member carried by the solenoid plunger is prevented from electrically contacting another regulating device contact member during solenoid plunger movement whereby system operation at the first motor flux level is facilitated in the absence of flux level signal issuance.

10. The system of claim 1, wherein electrical contact between the plurality of regulating device contact members defines an electrical short across the motor field winding second portion, and in the regulating device default operational state electrical contact between the plurality of regulating device contact members is prevented by the blocking member, whereby the system facilitates operation at the second motor flux level by default.

11. The system of claim 1, wherein electrical contact between the plurality of regulating device contact members defines a short across the motor field winding second portion, and in the regulating device activated operational state electrical contact between the plurality of regulating device contact members is prevented by the blocking member, whereby the system facilitates operation at the first motor flux level by default.

12. The system of claim 1, wherein electrical contact between the plurality of regulating device contact members defines a short across the motor field winding second portion, and the regulating device blocking member is selectively moveable between a retracted position wherein electrical contact between the plurality of regulating device contact members with the motor energizing switch closed is permitted by the blocking member, and an extended position wherein electrical contact between the plurality of regulating device contact members with the motor energizing switch closed is prevented by the blocking member.

13. The system of claim 12, wherein the regulating device comprises a solenoid mechanism including a moveable blocking plunger, movement of the blocking member imparted by movement of the blocking plunger, the blocking member biased into the blocking member extended position and moveable into the blocking member retracted position consequent to receipt by the solenoid mechanism of the issued flux level signal.

14. The system of claim 12, wherein the regulating device comprises a solenoid mechanism including a moveable blocking plunger, movement of the blocking member imparted by movement of the blocking plunger, the blocking member biased into the blocking member retracted position and moveable into the blocking member extended position consequent to receipt by the solenoid mechanism of the issued flux level signal.

15. The system of claim 1, wherein the starter assembly comprises at least one of the motor energizing switch and the regulating device.

16. The system of claim 1, wherein the starter assembly comprises a starter solenoid affixed to the motor, the starter solenoid comprises a solenoid plunger having axial movement generally parallel with the axis of motor rotation, and the starter assembly comprises at least one of the motor energizing switch and the regulating device.

17. The system of claim 16, wherein the starter solenoid comprises at least one of the motor energizing switch and the regulating device.

18. A method for varying starter motor flux levels between a first motor flux level, and a second motor flux level having a relatively lower pinion speed and relatively higher pinion torque, comprising the steps of:

selectively issuing a starter activation signal indicative of desired starter assembly activation with a control unit;

selectively issuing a flux level signal indicative of a desired motor flux level with a control unit;

selectively transitioning a regulating device between default and activated operational states consequent to the absence or issuance of a flux level signal;

closing a motor energizing switch in electrical communication with the motor field winding consequent to issuance of the starter activation signal;

energizing the motor field winding with current passed through the closed motor energizing switch;

relatively moving at least two regulating device contact members toward each other during closing of the motor energizing switch;

permitting electrical contact between a plurality of regulating device contact members with the motor energizing switch closed to define an electrical short across one of a pair of portions of the motor field winding in one of the regulating device default and activated operational states, to facilitate starter assembly operation at the first motor flux level; and preventing electrical contact between at least two regulating device contact members with the motor energizing switch closed to prevent an electrical short across said one motor field winding portion in the other of the regulating device default and activated operational states by interposing a blocking member between at least two of the regulating device contact members, to facilitate starter assembly operation at the second motor flux level.

19. The method of claim 18, further comprising the steps of:

closing the motor energizing switch by activating a starter solenoid consequent to issuance of the motor activation signal; and relatively moving at least two regulating device contact members towards each other with the solenoid plunger of the activated starter solenoid.

20. The method of claim 18, further comprising the step of abutting one of the regulating device contact members against the blocking member during closing of the motor energizing switch in said other of the regulating device default and activated operational states, to facilitate starter assembly operation at the second motor flux level.

* * * * *